Leonard C. Axelrod
Raymond S. Eugle
James B Fleming
Gerhard M. Kahn
Orlando J. Quadetull BY John C. Quinlan
Don H. Phillips
ATTORNEYS

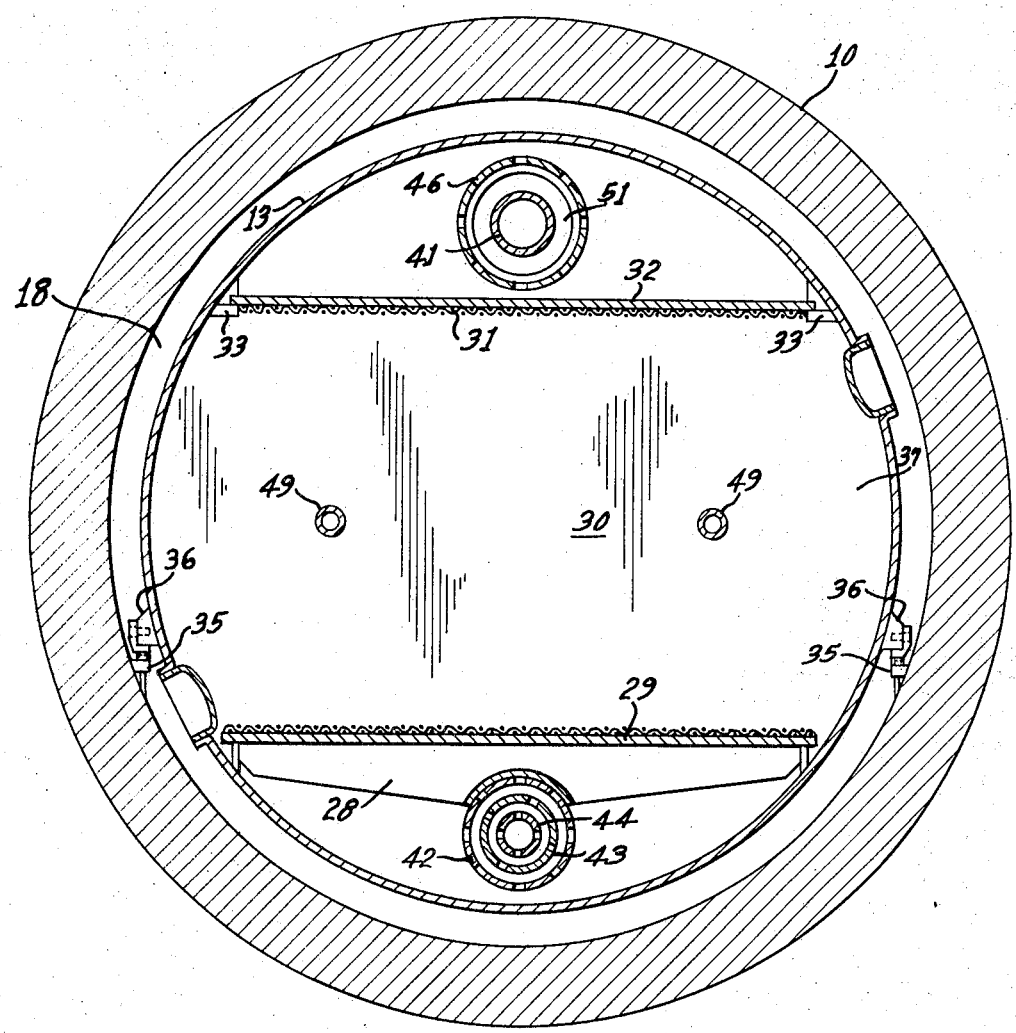

United States Patent Office 3,567,404
Patented Mar. 2, 1971

3,567,404
REACTOR VESSEL
Leonard C. Axelrod, Elizabeth, and Raymond S. Eagle, New Shrewsbury, N.J., James B. Fleming, Old Greenwich, Conn., and Gerhard M. Kahn, Flushing, and Orlando J. Quartulli, New York, N.Y., assignors to Pullman Incorporated, Chicago, Ill.
Filed Aug. 18, 1967, Ser. No. 661,673
Int. Cl. B01j 9/04
U.S. Cl. 23—289                                 5 Claims

ABSTRACT OF THE DISCLOSURE

A reactor vessel having an outer shell, a heat exchanger and an inner shell, the inner shell containing a series of catalytic reaction beds having their entrance areas disposed parallel to the longitudinal axis of the outer and inner shells.

---

The present invention relates to apparatus for effecting catalytic reactions under conditions of superatmospheric temperature and pressure. More particularly, this invention relates to an improved reactor vessel adapted for use in processes such as, but not limited to, ammonia synthesis or methanol synthesis. For illustrative purposes, the apparatus in accordance with the present invention is described herein relative to its use in the catalytic synthesis of ammonia from nitrogen and hydrogen, it being understood that its use is not so limited.

Apparatus for effecting catalytic synthesis of ammonia are conventionally known as ammonia converters or, more briefly, converters. Such apparatus generally consist of a plurality of catalyst beds in successive arrangement in relation to a heat exchanger or interchanger, all within an inner shell which is, in turn, contained within a high pressure outer shell. Between the inner shell and the outer shell there is formed an annulus through which the relatively cool entering gases or reactants flow prior to their entry into the heat exchanger. In the heat exchanger, heat is exchanged between the hot product gases leaving the final catalyst bed and the incoming reactant gases for the purpose of bringing the incoming gases up to that temperature at which the subsequent catalytic exothermic reaction proceeds spontaneously.

The catalytic reaction is conducted under superatmospheric pressures which conventionally vary between about 1200 and about 10,000 p.s.i.g. While the inner shell is designed for an operating pressure slightly greater than the difference in pressure between the inlet and the outlet gas streams, it is necessary to design the outer shell to withstand the several thousands of pounds pressure at which the inlet gas is introduced into the annulus between the shells.

The outer shell must have a wall thickness capable of withstanding the superatmospheric pressure mentioned. The size of the vessel is largely determined by considerations of space velocity and contact times, both of which depend upon the quantity of reactants and the quantity and conformation of the catalyst beds. Since there exist optimum conditions under which to conduct the synthesis gas reaction, the larger the required production capacity of the converter, the larger will be the converter.

Upon the inception of commercial ammonia production plants, production capacity was comparatively small and few equipment size problems were encountered. However, with recent developments of ammonia production plants having a capacity in excess of 1000 tons per day, in order to maintain optimum space and linear velocity conditions at reasonable pressure drops, converters of prohibitively large diameters, in view of their high operating pressures, have been required. Since the larger the diameter of the vessel, the thicker are its walls, it has sometimes been found necessary to substitute two parallel-operating converters for a single converter.

It is therefore a principal object of this invention to provide an improved apparatus for effecting catalytic reactions which apparatus is particularly suitable for carrying out such reactions on a large scale.

It is a further object of this invention to provide an ammonium converter having an increased production capacity without necessitating a proportional increase in converter costs.

Still another object of this invention is to provide an ammonia converter of increased capacity within the limits of acceptable design criteria.

Yet another object of this inevntion is to provide an ammonia converter having an increased production capacity and a minimum requirement of auxiliary supports and maintenance.

It is still a further object of this invention to provide a converter having a flow pattern of reactants therethrough such as permits increases in converter capacity to be accomplished by increasing the length of the converter rather than by increasing the diameter of the converter.

Various other objetcs and advantages of the invention will be apparent to those skilled in the art from the following detailed discussion and description.

In accordance with this invention, there is provided a reactor vessel comprising an outer shell containing a reaction zone including one or more beds of catalytic contact material, the reaction zone being spaced from the shell to form a passageway for the reactants between the inner wall of the outer shell and the reaction zone, and a heat exchanger for the exchange of heat between reactants and the reaction products, the entrance areas to the catalytic contact beds of the reaction zone being disposed parallel to the longitudinal axes of the reaction zone and the outer shell.

In employing the apparatus of this invention, mixed reactant gases are supplied through the outer shell of the apparatus and pass through the annular passage between the outer shell and the wall of the inner reaction zone into the heat exchanger. After heat exchange with the hot effluent from the reaction zone, the reactant gases flow in a direction perpendicular to the longitudinal axis of the outer shell and the inner reaction zone, across one or more beds arranged in series, the gases flowing from one bed to the next consecutive bed through a passageway formed therebetween, the direction of flow of the gases through said passageway being generally opposite to their direction of the flow through the catalyst bed.

The arrangement of flow in this manner greatly facilitates conducting the reaction and permits wide alteration of desirable variables. For example, it is possible to have flow downward across one bed and upward through the adjacent bed. This flow pattern of reactants through the converter has the effect of shortening the converter by eliminating the passageways between the beds. In this scheme of flow the primary mixing chambers, hereinafter described, provide open communication for the effluent from one bed to the entrance to the next successive bed.

The disposition of the beds as herein described provides a greater bed surface area available to gas flow than is normally possible in conventional reactors and accordingly results in considerable savings in horsepower compression requirements. Similarly, since lower pressure drops are encountered, it is possible to use smaller catalyst than with conventional flow. Smaller catalyst provides greater surface-active area and permits the use of a smaller amount of catalyst which, in turn, permits a decrease in the size of the reactor.

It is possible within the apparatus described herein to vary the amount of catalyst in the different beds and also to alter, as conditions may dictate, the entrance area to each bed. It is similarly possible to adjust the pressure drop of the reactants through the bed per foot of bed depth so as to improve distribution of reactant flow across the bed without increasing the total pressure drop across the reaction zone.

A more detailed understanding of the apparatus of the invention will be gained by referring to the detailed description of a preferred embodiment thereof, taken in conjunction with the accompanying drawings, wherein:

FIG. 2 is a transverse sectional view of a preferred embodiment of the converter taken through line 2—2 of FIG. 1.

Figure 1:
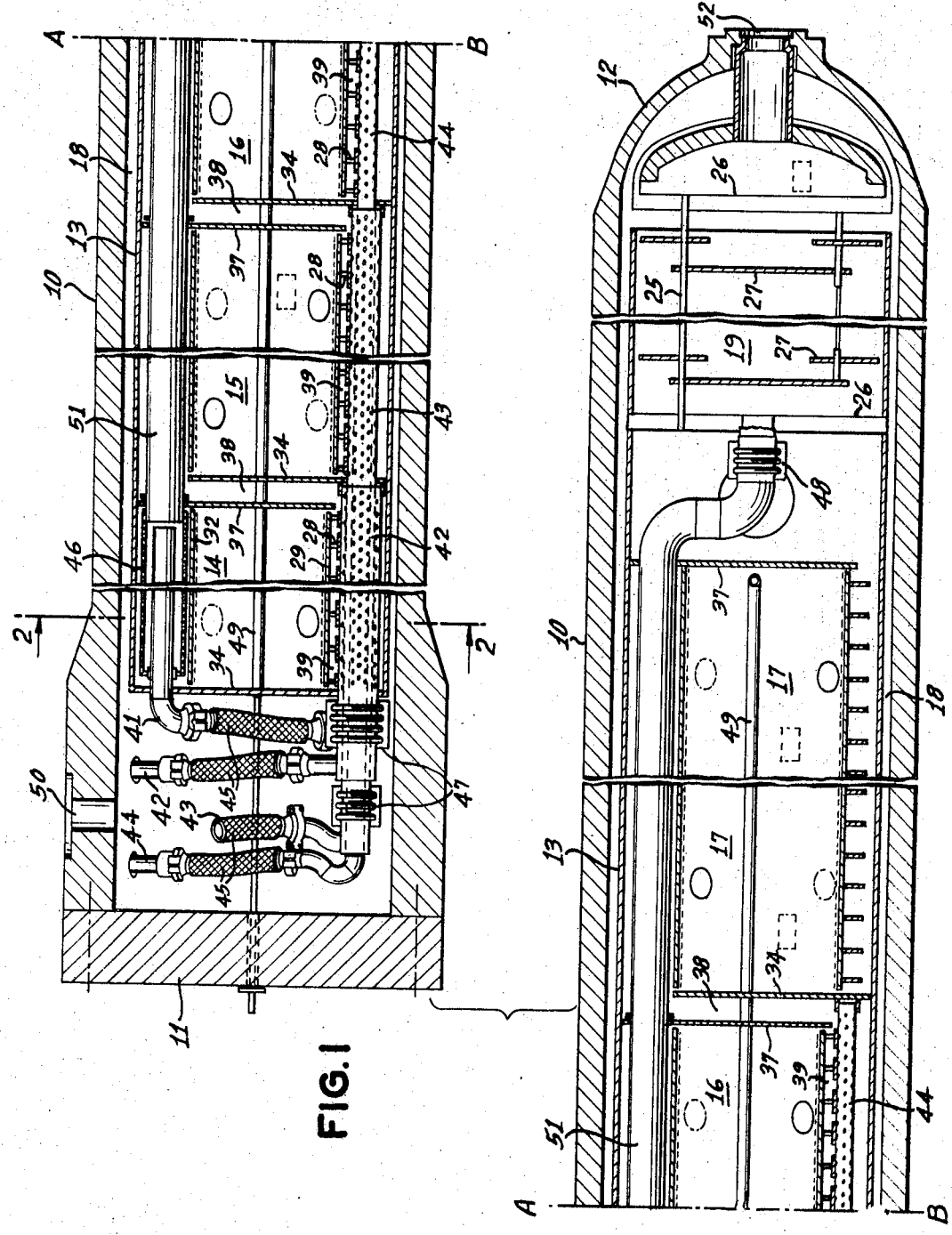
FIG. 1 is a cross-sectional view of a preferred embodiment of the converter according to this invention.

Referring now to FIG. 1, the converter has a thick-wall outer shell 10 closed at one end by inlet closure 11 and at the other end by outlet closure 12. Internal shell or basket 13 is continuous over its circumference and length and forms an internal cylindrical shell which contains catalyst beds 14, 15, 16 and 17. Between the inner walls of outer shell 10 and inner shell 13, there is formed annular area 18 which entirely surrounds inner shell 13. At the end of inner shell 13 there is located exchanger or interchanger 19.

Although the present invention applies equally to vertically-positioned converters, in the preferred embodiment of FIG. 1, the converter is positioned so that its longitudinal axis, that is, the longest dimension of the converter, is substantially parallel to the ground. This horizontal positioning of the converter provides additional advantages in maintaining and servicing the converter and provides economies in the structural support required for the converter.

Exchanger 19 is of conventional design, being comprised of exchanger tubes 25 between tubes sheets 26, and baffles 27. The number, length and diameter of tubes 25, and spacing of baffles 27 are such as to provide the necessary heat exchange between the incoming and outgoing streams as will be described later. Inner shell 13 and its contents are generally made withdrawable from outer shell 10 upon detachment of inlet closure 11.

Referring to FIG. 2, inner shell 13 is removed from, or inserted into, shell 10 along runners 35 and rests on these runners when in operating position. Catalyst beds 14, 15, 16 and 17 are similar in depth but, in other embodiments of the invention, may vary individually in depth and in length and more or less than the number of beds shown can be provided. Each bed has a series of grid supports 28 resting on the inner wall of inner shell 13. Grid supports 28 support any suitable catalyst support grid 29 on which catalyst 30 is placed. Screen 31 is attached to gas distribution grid 32 which, in turn, rests on support bars 33, screen 31 serving to retain catalyst 30 in place during catalyst loading. Both the catalyst support grid 29 and gas distribution grid 32 are so designed as to allow flow of reactants into and out of the catalyst bed included therebetween.

Referring again to FIG. 1, catalyst beds 14, 15, 16 and 17 are each terminated along the longitudinal axis of the vessel by inlet catalyst bed wall 34 and outlet catalyst bed wall 37. Bed walls 34 and 37 are vertically positioned in relationship to support grid 29 and distribution grid 32, thus forming an entrance area to the catalyst beds and an exit area from the catalyst bed. Bed walls 34 extend beyond the support grid 29 at one end of the catalyst bed while bed walls 37 extend beyond the distribution grid 32 at the opposite end of the catalyst bed, thereby forming an inter-bed flow area or secondary mixing chamber 38 for passage of the reactants from one catalyst bed to the next in a direction opposite of, but generally parallel to, the direction of flow of reactants through the bed. The reactant flow pattern so formed is such as to affect flow through the catalyst beds in a direction perpendicular to the longitudinal axis of the outer shell 10 and the inner shell 13, flow through all beds being in the same direction.

As previously mentioned, an alternative embodiment of the invention may have flow downward across one bed and upward through the adjacent bed, the primary mixing chambers providing open communication for the effluent from one bed to the entrance to the next successive bed. Under this flow pattern, a common bed wall is supplied between adjacent beds, the inter-bed flow areas being thereby eliminated, the primary mixing chambers being extended from one bed to the next adjacent bed, above or below the beds as required. Similarly, quench distribution line discharges, hereinafter discussed, are relocated as necessary to discharge into the effluent from the respective catalyst bed.

Immediately below each bed is an area designated as primary mixing chamber 39 which serves as a quench distribution zone for that quench introduced into the effluent of the beds as later discussed. Such areas provide much more intimate quenching for the quench so introduced than does quenching by introduction of the quench directly into the bed.

The volume of catalyst provided in the catalyst beds depends principally upon the spacing between inlet catalyst bed walls 34 and outlet catalyst bed wall 37. These volumes may be essentially equal for all beds or the bed walls 34 and 37 may be spaced so as to provide different volumes of catalyst in each bed. Accordingly, for larger capacity units, it is necessary only to increase the length of the unit to attain desired space and lineal velocities as contrasted to increasing the diameter of the reactor as in conventional reactors. This, in effect, permits an increase in production capacity of the reactor while retaining a diameter of the converter which is within the limits of acceptable design criteria. Furthermore, due to the large surface area of the bed and its short depth, there is considerably less pressure drop involved in the flow of gases through the bed than exists when the same quantity of gases flows in a direction parallel to the longitudinal axis of the converter through a bed of equal catalyst volume.

Exothermic heat is generated during the catalytic reactions described herein. As a result, inner shell 13 is subjected to a considerably higher temperature than is outer shell 10, particularly in view of the cooling effect of the inlet reactant gas on outer shell 10 when flowing through annular area 18. Accordingly, inner shell 13 is freely supported by rails 35 of FIG. 2 affixed to the inner surface of shell 10. Shell supports 36 affixed to the outer surface of inner shell 13 rest on rails 35, permitting inner shell 13 and its contents to elongate upon expansion and thus compensate for any thermal expansion encountered. Such arrangement also facilitates the disassembly of the equipment by permitting inner shell 13 and its contents to be removed from outer shell 10 upon removal of inlet closure 11.

Reasonably close temperature control of the reaction is required; that is, there exist optimum operating temperatures at which the catalyst beds are preferably maintained. To control catalyst bed temperatures, a catalyst quench system is provided by which a relatively cold material, such as a portion of the reactant stream, is proportioned as desired to each of the catalyst beds. For best distribution of the quench material, individual quench lines are provided to certain of the beds preferably through separate introduction lines. Individual quench introduction lines to the reactants to each bed are preferable since these individual lines provide a more positive method of temperature control for each of the individual beds.

Referring to FIG. 1, quench is introduced through quench lines 41, 42, 43 and 44 from separate points through outer shell 10. Since these lines are fixed at their points of entry through shell 10, they are provided with flexible means, such as flexible hoses 45, to accommodate for the previously mentioned expansion of inner shell 13.

Quench line 41 is routed to the reactant inlet side of catalyst bed 14, the first bed into which the charge gas is routed. Quench line 41 terminates within charge line distributor 46 within inner shell 13, into which charge line distributor charge line 51 similarly discharges, as explained later. Mixing of quench and charge within charge line distributor 46 at this point is provided for the purpose of regulating the temperature of the reactants to the initial bed. Charge line distributor 46 has apertures in its longitudinal walls, these apertures providing for the discharge of the combined charge-quench mix into catalyst bed 14. Inasmuch as the end walls of charge line distributor 46 are sealed, at one end around quench line 41 and at the other end around charge line 51, discharge from charge line distributor 46 is limited to entry to catalyst bed 14.

Quench lines 42, 43 and 44 discharge into a series of concentric pipes which are routed into inner shell 13. Quench line 44 is continued up to that bed wall terminating the bed, the effluent from which it quenches. Apertures in the walls of quench line 44 provide for the distribution of quench passing therethrough into the reactants from catalyst bed 16. By doing so, temperature control is exerted over cataylst bed 17. Quench line 43 continues to the bed wall terminating catalyst bed 16. Quench to the effluent of catalyst bed 15 flows through the annular area formed by quench pipe 43 and 44 discharges through apertures into catalyst bed 15 effluent in a similar manner. Quench line 42 provides quench for catalyst bed 14 effluent. As required, expansion joints 47 are located in the concentric structures of the quench lines to compensate for the expansion of inner shell 13 as discussed above. Although there are certain advantages such as economy of space to having the quench lines arranged concentrically, it is possible to provide separate individual quench lines to the beds.

It was previously mentioned that the feed to the converter was originally routed through exchanger 19. From exchanger 19 the charge reactants pass through charge line 51 and discharge into charge line distributor 46 as described above. Expansion joint 48 in charge line 51 prevents the establishment of undue stresses within charge line 51 under the expansion discussed above.

For purposes of determining the quantity of quench to be introduced through the aforementioned quench lines 41, 42, 43 and 44, it may be desirable to provide thermocouples 49 which extend into the individual catalyst beds and measure the temperature therefrom.

In operation, the reactants are charged to the converter into outer shell 10 through inlet nozzle 50 and are directed into the annular area 18 between outer shell 10 and inner shell 13. The reactants flow into the heat exchanger 19 and across the baffling 27 leaving the heat exchanger through charge line 51. The reactants then flow into the charge line distributor 46 in which they may be mixed with quench introduced through quench line 41. The mixture discharges into catalyst bed 14, passes therefrom and flows in the secondary mixing chamber 38 between bed walls 34 and 37 and down into catalyst bed 15. Flow is continuous in a similar manner successively through catalyst beds 15, 16 and 17, quench being introduced to the reactants to these beds as necessary. The effluent from catalyst bed 17 flows through tubes 25 of heat exchanger 19. In this heat exchanger 19, heat is exchanged between hot gases leaving the catalyst beds and the cooler gases being routed to the catalyst beds, thus bringing the cooler reactant gases to the catalyst beds up to a temperature at which the catalytic reaction within the catalyst beds proceeds spontaneously. The cooled product gases leave the reactor through outlet nozzle 52.

It will be seen from the above that the described converter possesses distinct advantages over converters previously employed in addition to those advantages previously set forth. The horizontal positioning of the converter permits removal of the inner shell or basket and catalyst replacement without the use of heavy lifting equipment as is required for vertically-positioned converters, partially due to the fact that the inner shell or basket can be rolled out of the converter on a track and does not need to be lifted from the shell. These factors contribute significantly to reduced maintenance costs.

Similarly, the flow pattern through the catalyst beds offers distinct advantages. Relatively shallow bed depth and large gas-entry surface area as compared to prior art designs contribute to low gas velocities through the bed and result in lower pressure drop than that sustained by an equivalent catalyst bed of the prior art design. Accordingly, in using the additional pressure drop available, catalyst of smaller particle size can be employed which, in turn, increases conversion per bed and overall production and lowers equipment and catalyst costs inasmuch as the use of smaller catalyst beds decreases equipment size.

It is to be understood that various changes in the details, steps, and arrangements of parts, described hereinabove for purposes of illustrating the invention, may be made by those skilled in the art without departing from the scope of the invention. For example, it is possible to relocate the heat exchanger in respect to the reactant inlet, or to alter the flow of reactants and products through the shell or tube side of the exchanger or even to locate the exchanger exterior of the converter proper. It is also possible to provide other means of quench introduction or locations to which it is introduced. It is similarly possible to provide manholes in the vessel for catalyst removal and to make the catalyst bed walls movable so as to alter the size of the catalyst beds upon catalyst replacement. No changes such as these, however, are considered as being beyond the scope of the invention as herein claimed.

Having described out invention, we claim:

1. A reactor vessel comprising:
an outer pressure shell;
an inner shell positioned within said outer shell;
at least two first foraminous grids positioned within said inner shell and extending parallely to the central axis of the reactor vessel to provide a set of first passageways each such first passageway being disposed between the inner shell and one of said first grids;
at least two second foraminous grids within said inner shell, each second grid in juxtaposition to a first foraminous grid to provide a set of second passageways each such second passageway being disposed between the inner shell and one of said second grids;
at least two slab-shaped catalyst beds, each bed disposed between one of said first grids and a juxtaposed second grid;
means for separating one first passageway from an adjacent first passageway;
means for separating one second passageway from an adjacent second passageway;
two spaced walls disposed between adjacent catalyst beds to provide for sequential flow of fluid from the first passageway associated with one of said catalyst beds, thence through said one catalyst bed, into the second passageway associated with said one catalyst bed, between said spaced walls and into the first passageway associated with the adjacent catalyst bed;
means to pass reactant fluid to the outer shell;
means to pass reactant fluid from the outer shell to the first passageway associated with the first catalyst bed, and
separate means to pass effluent fluid from the second passageway associated with the last catalyst bed to the outside.

2. The reactor vessel according to claim 1 in which the central axis of the reactor vessel is horizontally disposed and the inner shell is slidably disengageable from said outer shell.

3. The reactor vessel according to claim 1 which further comprises first means for introducing quench fluid through the outer shell into the reactant fluid prior to the passing of said reactant fluid through the first catalyst bed, and separate second means for introducing quench fluid through the outer shell and thence to a second passageway associated with a catalyst bed.

4. The reactor vessel of claim 2 wherein an indirect heat exchanger having reactant fluid inlet means and outlet means and effluent fluid inlet means and outlet means is mounted within said outer shell, and wherein said means for passing reactant fluid from the outer shell to the first passageway of the first bed is comprised of the reactant fluid inlet means and outlet means of said heat exchanger and wherein said means for passing effluent fluid from the second passageway of the last bed to the outside is comprised of the effluent inlet means and outlet means of said heat exchanger.

5. A reactor vessel comprising:
an outer pressure shell;
an inner shell positioned within said outer shell;
at least two first foraminous grids positioned within said inner shell and extending parallely to the central axis of the reactor vessel to provide a set of first passageways, each such first passageway being disposed between the inner shell and one of said first grids;
at least two second foraminous grids within said inner shell, each second grid in juxtaposition to a first foraminous grid to provide a set of second passageways, each such second passageway being disposed between the inner shell and one of said second grids;
at least two slab-shaped catalyst beds, each bed disposed between one of said first grids and a juxtaposed second grid;
a wall at the end of each bed perpendicularly disposed with respect to the central axis of the reactor vessel;
means for separating the first passageway associated with the first bed from the first passageway associated with the second bed to provide for sequential flow of fluid from the first passageway associated with the first catalyst bed, thence through said first bed, into the second passageway associated with the first catalyst bed and into the second passageway associated with the second catalyst bed;
means to pass reactant fluid to the outer shell;
means to pass reactant fluid from the outer shell to the first passageway associated with the first catalyst bed;
separate means to pass fluid through the outer shell and thence to the second passageway associated with the first catalyst bed, and
separate means to pass effluent fluid from the last catalyst bed through the outer shell to the outside.

References Cited
UNITED STATES PATENTS

| | | | |
|---|---|---|---|
| 3,002,816 | 10/1961 | Friend et al. | 23—199 |
| 3,069,348 | 12/1962 | Bergstrom | 208—64 |
| 2,909,415 | 10/1959 | Houdry | 23—288.3FUX |

JAMES H. TAYMAN, Jr., Primary Examiner

U.S. Cl. X.R.

23—1, 199, 288; 208—64; 252—416; 260—449.5